United States Patent [19]

Imhof et al.

[11] Patent Number: 5,395,710
[45] Date of Patent: Mar. 7, 1995

[54] POROUS ELECTRODE FRAMEWORK PLATE WITH WELDED-ON CURRENT DISCHARGE LUG FOR ELECTROCHEMICAL STORAGE CELLS

[75] Inventors: Otwin Imhof, Nürtingen; Wilhelm Kitzhöfer, Brilon 6-Petersborn, both of Germany

[73] Assignees: Deutsche Automobilgesellschaft mbH; Daug-Hoppecke Gesellschaft fuer Batteriesystems mbH, Germany

[21] Appl. No.: 101,053

[22] Filed: Aug. 4, 1993

[30] Foreign Application Priority Data

Aug. 4, 1992 [DE] Germany .................. 42 25 708.5

[51] Int. Cl.⁶ ..................................... H01M 2/20
[52] U.S. Cl. ..................................... 429/161; 429/211
[58] Field of Search ........................... 429/161, 211

[56] References Cited

U.S. PATENT DOCUMENTS

| 5,085,956 | 2/1992 | Imhof et al. | 429/211 |
| 5,086,969 | 2/1992 | Guerinault et al. | 429/211 X |
| 5,246,797 | 9/1993 | Imhof et al. | 429/211 |

FOREIGN PATENT DOCUMENTS 3632352 9/1986 Germany .
3734131 10/1987 Germany .

*Primary Examiner*—Prince Willis, Jr.
*Assistant Examiner*—M. Nuzzolillo
*Attorney, Agent, or Firm*—Evenson, McKeown, Edwards & Lenahan

[57] ABSTRACT

An electrode plate is formed from a porous electrode framework with welded-on current discharge lug for use in electrochemical storage cells. The electrode framework is formed from metallized plastic and has a current discharge lug welded on in a unilateral and overlapping manner on the weld-on edge of the electrode framework. The material thickness of the current discharge lug decreases in the weld-on end towards the weld-on edge. The material of the electrode framework assigned to the weld-on end of the current discharge lug is compressed in the region of the overlap. For greater stability of the welding, the weld-on end of the current discharge lug is formed by teeth spaced apart from one another by teeth interspaces. The teeth interspaces are at least wide enough that, when there is pressing during the welding on of the current discharge lug, the material of the electrode framework can swell between the teeth.

23 Claims, 2 Drawing Sheets

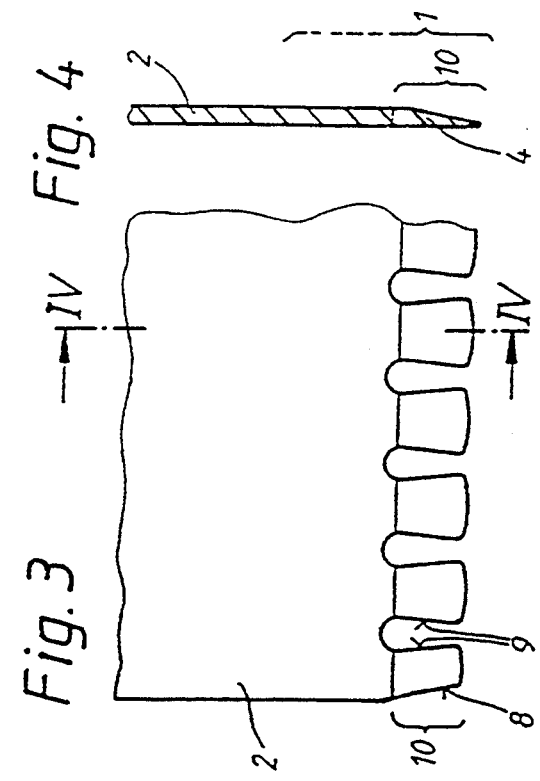
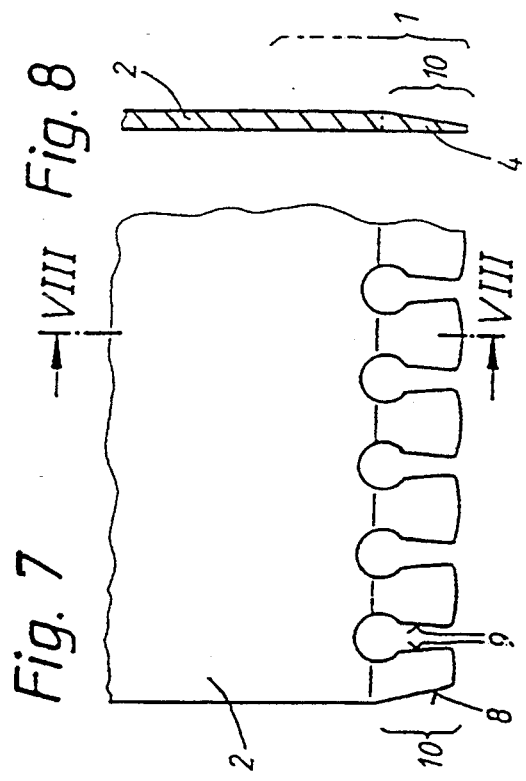
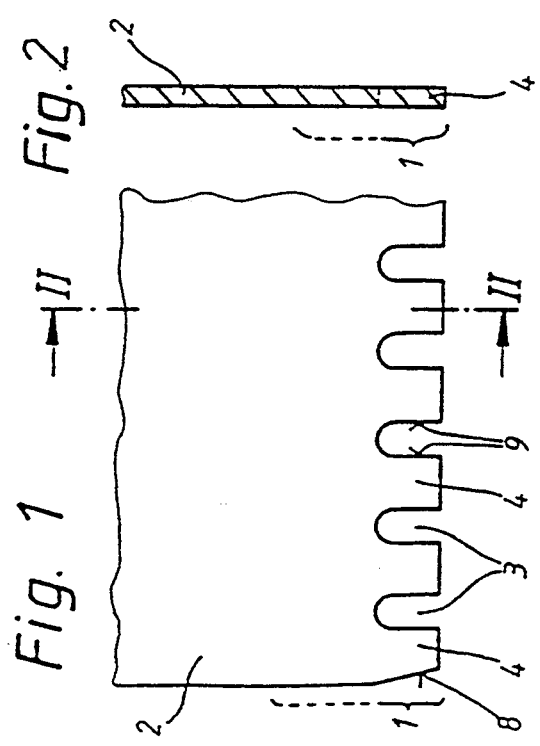
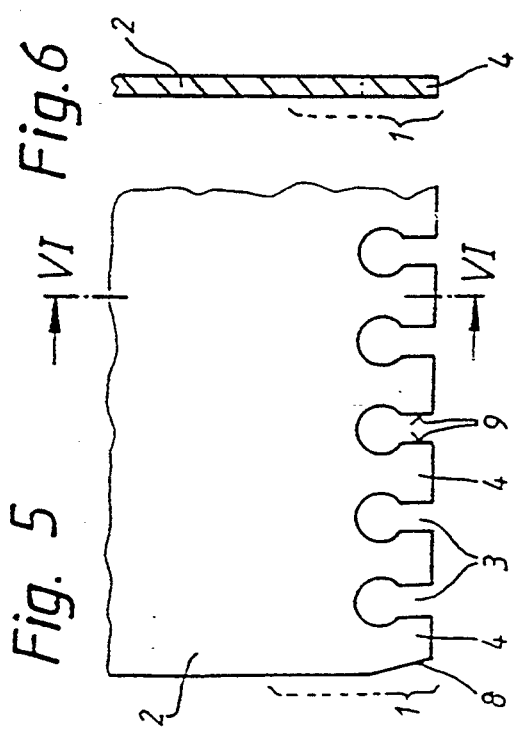

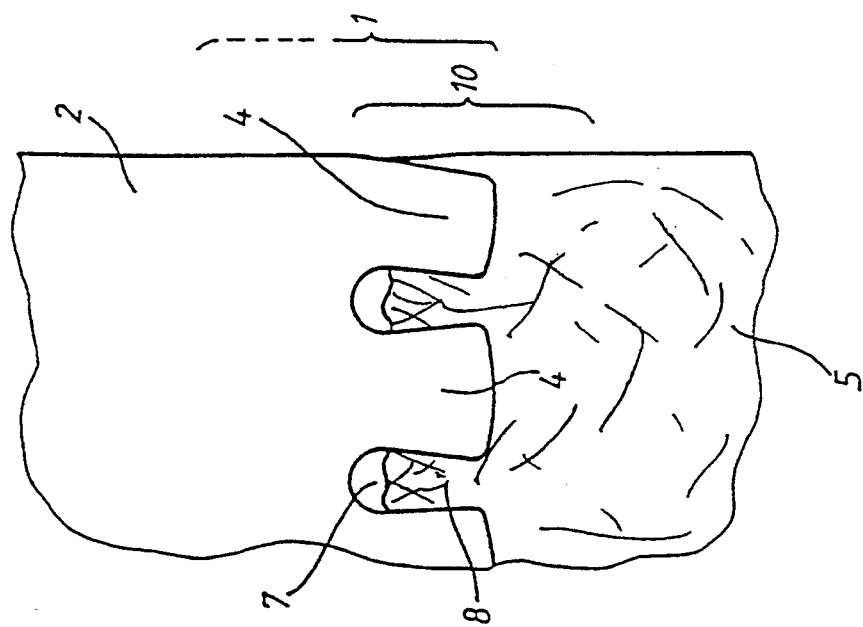
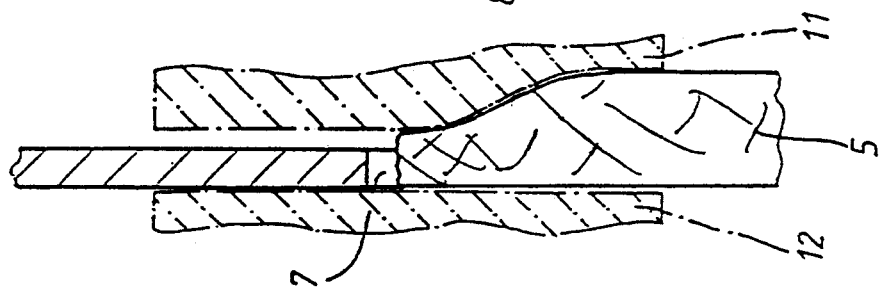
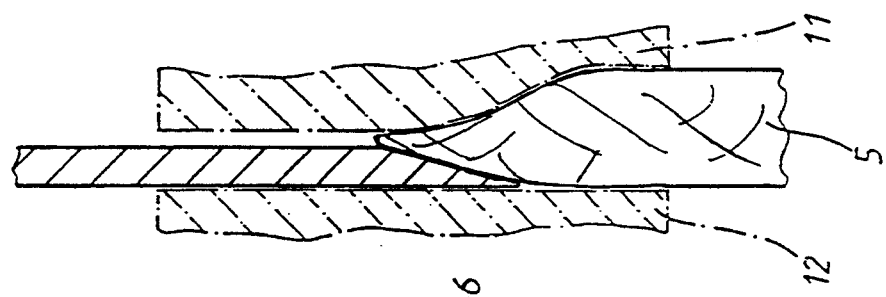
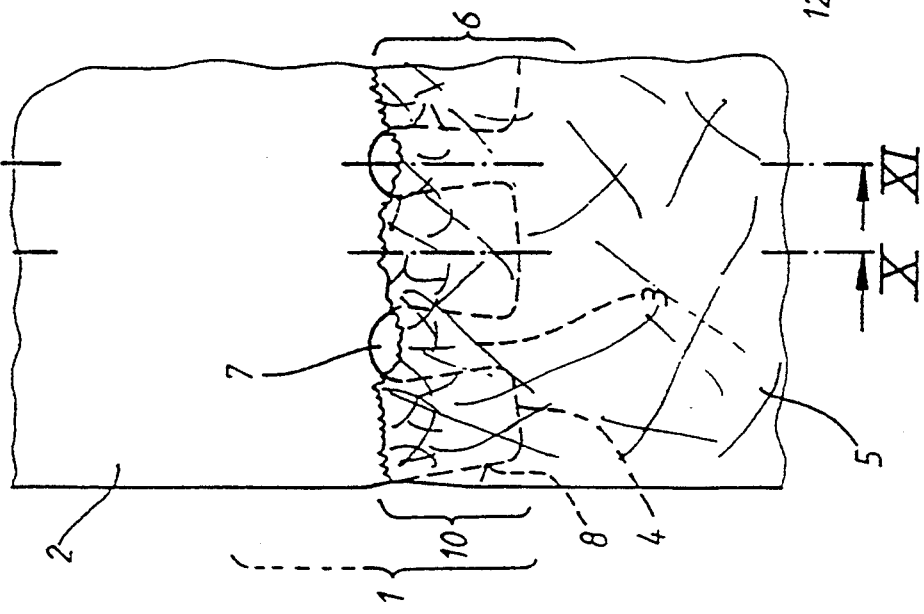

POROUS ELECTRODE FRAMEWORK PLATE WITH WELDED-ON CURRENT DISCHARGE LUG FOR ELECTROCHEMICAL STORAGE CELLS

BACKGROUND AND SUMMARY OF THE INVENTION

The present invention relates to an electrochemical storage cell electrode plate, formed from a porous electrode framework with welded-on current discharge lug, with the current discharge lug being welded on in an overlapping manner at the weld-on edge of the electrode framework, and a weld-on end thereof exclusively on only one flat side of the electrode framework. The material thickness of the current discharge lug decreases in the weld-on end towards an edge, and the electrode framework is compressed in the region of overlapping with the weld-on end of the current discharge lug. The present invention also relates to a novel process for production of the above-described electrode plate.

German Patent No. 3,632,352 describes an electrode plate having an electrode framework which is fabricated from metallized synthetic fibers, removed if appropriate after metallizing, and provided on its weld-on edge with a unilaterally welded-on thick current discharge lug in the region of its weld-on end, the current discharge lug has a material draft which tails away in the direction of the electrode framework. The material, draft of the current discharge lug overlaps unilaterally the weld-on edge of the electrode framework of the fiber structure electrode. The fiber structure electrode is compressed in the region of the overlap such that the current discharge lug keeps within the extent of the thickness of the fiber structure electrode. The current discharge lug is electrical-resistance welded in the region of its weld-on end to this electrode framework, and the electrode framework projects in the direction of the current discharge lug beyond the region of material draft.

Although the welding of the current discharge lug to the electrode framework in the foregoing known manner is generally stable, a partial incipient crack occurs, particularly in the case of strong vibrations acting on the electrode framework, and this crack is accompanied by an increase in the transition resistance which can spread to the extent that the current discharge lug is detached completely from the electrode framework. Even without an incipient crack, the strength and transition resistance are not optimal.

German Patent No. 3,734,131 discloses a porous electrode framework with a welded-on thin current discharge lug. The material of the electrode framework which is assigned to the weld-on end of the current discharge lug is compressed in the region of the overlap, and the weld-on end of the current discharge lug is subdivided by incisions into three tongues. The tongues, which have a negligible transverse spacing with respect to one another, are bent alternately on opposite flat sides of the weld-on edge of the electrode framework and pressed into the, respective flat side. In the region of these impressions shearing effects and crack formations, occur because, inter alia, of the next-following tongue pressed in on the opposite flat side. These effects and formations reduce the stability of the current discharge lug on the electrode framework.

An object of the present invention is to further improve the basic electrode plate to the extent that the welding has a higher strength and a lower transition resistance from the electrode framework to the current discharge lug.

The foregoing object has been achieved in an electrode plate according to the present invention by the provision that the weld-on end of the current discharge lug comprises teeth spaced apart from one another by teeth interspaces, the teeth interspaces being at least wide enough to receive swelling material of the electrode framework during pressing on of the current discharge lug and by a process in which and, during welding, the material of the electrode framework is pressed into the teeth interspaces and is also welded onto flanks of the teeth interspaces.

Because the welding is also performed at the flanks of the teeth, the material of the electrode framework can swell in the teeth interspaces, the welding of the present invention has a high strength. Furthermore, due to the elongated weld edge, the transition resistance from the electrode framework to the current discharge lug is lower ever in the case of thin electrode frameworks. Rejects in the production of the current discharge element weld-on is likewise reduced.

BRIEF DESCRIPTION OF THE DRAWINGS

These and other objects, features and advantages of the present invention will become more readily apparent from the following detailed description thereof when taken in conjunction with the accompanying drawings wherein: FIG. 1 is a partial view of a cutout of a current discharge lug after the teeth have been punched out;

FIG. 2 is a cross-sectional view through the current discharge lug along line II—II of FIG. 1;

FIG. 3 is a partial view of the cutout of ..the current discharge lug shown in FIG. 1 but after the hammering of a wedge-shaped material draft;

FIG. 4 is a cross-sectional view through the current discharge lug along line IV—IV of FIG. 3;

FIG. 5 is a partial view of a cutout of another embodiment of a current discharge lug after the punching out of the teeth, with a round teeth interspace at the root of the teeth;

FIG. 6 is a cross-sectional view through the current discharge lug along line VI—VI of FIG. 5;

FIG. 7 is a partial view of the cutout of the current discharge lug shown in FIG. 5 but after the hammering of a wedge-shaped material draft;

FIG. 8 is a cross-sectional view through the current discharge lug along line VIII—VIII of FIG. 7;

FIG. 9 is a partial front view of an electrode framework welded onto the current discharge lug, from the side of the material draft;

FIG. 10 is a cross-sectional view through the electrode framework along line X—X of FIG. 9;

FIG. 11 is a cross-sectional view through the electrode framework along line XI—XI of FIG. 9; and FIG. 12 is a partial rear view of the electrode framework of FIG. 9, from the flat side lying opposite the material draft.

DETAILED DESCRIPTION OF THE DRAWINGS

In FIGS. 1 to 8, two preferred embodiments of current discharge lugs 2 are shown in which the two current discharge, lugs 2 differ by the form of their teeth interspaces 3. The current discharge lug 2 represented in FIGS. 1 to 4 has teeth interspaces 3 which are initially rectangular with a rounded base, whereas the current discharge lug 2 represented in FIGS. 5 to 8 is of a circular design in the region of the root of the teeth 4 at the weld-on end 1 of the current discharge lug 2, and consequently provides a better hooking with the weld-on edge 6 of the electrode framework 5. The two outer teeth 4 (only one outer tooth is shown in FIGS. 1 to 8) are bevelled in an inwardly directed manner on their outer edge or side.

During the punching out of the current discharge lugs 2, teeth 4 with associated interspaces 3 lying in between are punched out at their lower weld-on end 1 in, for example, the 1.2 mm thick current discharge lugs 2. The width of the teeth interspaces 3 is preferably between 3 mm and 5 mm and the length of the teeth 4 is preferably between 7 mm and 10 mm. After the punching out of the teeth 4 and of the teeth interspaces, 3, the teeth 4 are provided with a material draft 10 (in this illustrated embodiment running linearly), by a massive working operation, in particular by hammering. The teeth 4 widen, as viewed in FIG. 3, towards their end due to the material flow of the worked teeth 4 and, in this way, later clench positively, against pulling off, in the region of the reinforced weldon edge 6 of the electrode framework 5.

The material draft 10 has an angle with the flat side of the current discharge lug 2 of between 5° and 20°, in particular an angle of between 8° and 10°. If the angle is too small, the mate, rill draft 10 is too long, which can result in a reduction in the cross-section of the transition from the electrode framework 5 to the current discharge lug 2; if the angle is too large, the transition from the compressed zone of the electrode framework 5 to the uncompressed part is too abrupt, so that there is the risk of stresses arising in the electrode framework 5 and of the material of the electrode framework 5 on the excessively steep material draft 10 partially shifting downwards in an uncontrolled manner during the welding operation.

In FIGS. 9 to 12, the current discharge lug 2 of FIG. 3 is shown with its teeth 4 and its teeth interspaces 3, with welded-on electrode framework 5, in front view (FIG. 9), in section through a tooth 4 (FIG. 10), in section through a teeth interspace 3 (FIG. 11 ) and in rear view (FIG. 12). For welding, the weld-on edge 6 of the electrode framework 5, galvanically reinforced with nickel, is positioned before welding to half the height of the material draft 10 of the current discharge lug 2, and the lower electrode 12 and the shaping upper electrode 11 are attached. The welding takes place substantially in that zone in which the upper electrode 11 is parallel to the lower electrode 12 and in which it is elevated the most. For welding, the lower electrode 12 lies flush on the lower flat side of the current discharge lug 2, held in a defined position, and on the corresponding flat side, in alignment with the latter flat side, of the electrode framework 5, likewise held in a defined position. The upper electrode 12 is lowered under pressure onto the electrode framework 5, whereby the weld-on edge 6 of the electrode framework 5 is, inter alia, compressed. Furthermore, in the region of the weld-on edge 6, for one thing the material of the electrode framework 5 runs out on both sides approximately continuously to the full thickness into the teeth interspaces 3. On the side of the electrode framework 5 facing away from the current discharge lug 2, this is achieved by a corresponding shaping of the upper electrode 11. In FIGS. 10 and 11, this transition is recognizable from the slightly curved shape of the upper electrode 11, shown in dashed lines. It is, however, also possible to realize this transition by a bevelling with corresponding radii.

Furthermore, in the welding operation, the reinforced weld-on edge 6 is deformed and the slope of the material draft 10 is pushed up at the same time, so that even nickel dendrites are placed as far as beyond the upper edge of the material draft 10, which is located below the root of the teeth 4 at the weld-on end 1 of the current discharge lug 2, and are welded. Due to the pressing operation of the welding and due to the heating of the material in the welding zone, the weld-on edge 6 of the electrode framework 5 is also additionally pressed downwards in the teeth interspaces 3. In this case, very good contacts are achieved at the flanks 9 of the teeth 4, so that welding surfaces and welding zones are additionally produced here. Due to the above-described widening of the teeth 4 in the direction of their end, a hooking of the electrode framework 5 with the weld-on end 1 of the current discharge lug 2 also takes place. Due to the teeth interspaces 3, moreover, the electrode framework 5 is not compressed in the teeth interspaces 3 to such an extent as in the region of the teeth 4, whereby the natural orientation of the fibers of the electrode framework 5 is largely preserved. Furthermore, a reservoir for excess melt is also created.

Tests have shown that an electrode plate according to the invention with a thickness of the electrode framework 5 of 1.5 mm and a sample width of 40 mm on average withstands 860N in a tensile test, with a breaking length of 2 mm. With a thickness of the electrode framework 5 of 2.5 mm and a sample width of likewise 40 mm, this value increases to 1095N with a breaking length of 4.5 mm. The values in all the cases discovered relating to samples which have been taken from the center and from both edges of the test pieces. It is especially notable in the case of an electrode framework/current discharge lug welding according to the present invention that the values for strength change only slightly over the extent of the weld-on edge, whereas in the case of conventional joints, in, particular with a width of the electrode framework 5 greater than 120 mm and especially in the case of thin frameworks (1.5 mm), sometimes there was no welding at all on the outer sides 8 of the current discharge lug 2.

The advantages achieved with the present invention, in particular in the case of current discharge lugs 2 of a thickness greater than 1.0 mm, are, inter alia, that the strength of the joint is increased in comparison with the prior art by over 10% and on the outer sides 8 even sometimes over 50%. Furthermore, the number of rejects in welding drops by up to 30%, since there are now, apart from the highly pressed zones in the region of the teeth 4, also less compressed zones in the region of the teeth interspaces 3. These advantages arise because, in the welding, among other things, a uniform pressure distribution is achieved over the entire length of the weld and an altogether uniform pressure distribution is achieved due to always the same contact points and contacts at regular intervals.

Furthermore, in spite of the forces occurring during welding, the electrode framework 5 can relax, yield, hook with the current discharge lug 2 and regenerate due to the design of the teeth interspaces 3. In addition, due to the teeth interspaces 3, the welding zone bears not only against the material draft 10, but also against the flanks 9 of the teeth 4, whereby the electrode framework 5 is also fused with the flanks 9. As a result, the joint can be loaded not only transversely to the row of teeth, but also parallel to it, for which reason it is suitable in particular for applications in vibration-subjected traction batteries.

In destructive testing, this is recognizable from the respective detaching of the electrode framework 5 at the flanks 9 of the teeth 4 and on the surfaces of the material draft 10.

Due to the gradual transition from the highly compressed weld-on edge 6 on the material draft 10 to the full thickness of the electrode framework 5, the greater-metallized and consequently particularly stable weld-on edge 6 is, in certain sections, loaded the most and deforms the most. Due to the shaping of the upper welding electrode 11, a lesser force is exerted on the portions lying in front of the stable weld-on edge, so that the deformation of the less nickel-plated region of the weld-on edge 6 is less and tends towards zero. In addition, it is ensured that abrupt transitions cannot occur in any region of the welding zone and of the areas adjoining thereto, for which reason it is also favorable to provide the flanks 9 of the teeth 4 with a chamfer, in particular with a gradual material draft. Due to the sharp drop in the numbers of rejects in the production of the welded joint and the subsequent fabrication, less quality assurance measures have to be taken in the area of electrode plate production, impregnation, welding of the plate stacks and cell assembly, accompanied by a considerable saving in terms of cost and fabrication time.

The electrode plate can be fabricated from either nonwoven or needle-felt sheets, the porosity of unworked felt being between 50% and 98%, the weight per unit area of the felt being between 50 $g/cm^2$ and 900 $g/cm^2$, the diameter of the synthetic fibers of the felt being between 0.4 dtex and 7.5 dtex, the length of the synthetic fibers of the felt being between 15 mm and 80 mm, the fibers being activated, chemically metallized and galvanically reinforced by a metal coating, and the electrode framework being covered by a nickel coating of between 25 mg $Ni/cm^2$ and 300 mg $Ni/cm^2$.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An electrode plate comprising a porous electrode framework with welded-on current discharge lug for use in electrochemical storage cells, the current discharge lug being welded on in an overlapping manner at a weld-on edge of the electrode framework, a weld-on end thereof being provided exclusively on only one flat side of the electrode framework, the current discharge lug having a material thickness decreasing in the weld-on end towards a lower edge thereof, and the electrode framework being compressed in a region of the overlapping with the weld-on end of the current discharge lug, wherein the weld-on end of the current discharge lug comprises teeth spaced apart from one another by teeth interspaces, the teeth interspaces being at least wide enough to receive swelling material of the electrode framework during pressing on the current discharge lug.

2. The electrode place according to claim 1, wherein a width of the teeth interspaces decreases in the direction of the electrode framework.

3. The electrode plate according to claim 1, wherein a depth of the region in which the material thickness is decreased, measured in a longitudinal direction of the current discharge lug, is less than a depth of the teeth interspaces.

4. The electrode plate according to claim 1, wherein the current discharge lug overlaps the weld-on edge of the electrode framework by no more than the length of the teeth, measured in the direction of the current discharge lug.

5. The electrode plate according to claim 1, wherein a clearance is arranged in the region of the teeth interspaces between a root of the teeth and the weld-on edge of the electrode framework.

6. The electrode plate according to claim 1, wherein the electrode framework has a thickness of between, about 1 mm and 8 mm.

7. The electrode plate according to claim 1, wherein the current discharge lug has a thickness of between about 0.5 nm and 2 mm.

8. The electrode plate according to claim 1, wherein two outer teeth are bevelled in an inwardly directed manner on their outer sides.

9. The electrode plate according to claim 1, wherein the material thickness of the teeth of the current discharge lug decreases on the bearing side thereof linearly at an angle of 5° to 25°.

10. The electrode plate according to claim 1, wherein the width of the teeth interspaces corresponds approximately to the material thickness of the electrode framework and is about 2 mm to 10 mm.

11. The electrode plate according to claim 1, wherein the length of the teeth corresponds approximately to the material thickness of the electrode framework plus 3 mm to 5 mm and is about 5 mm to 12 mm.

12. The electrode plate according claim 1, wherein the teeth are no wider than twice the width of teeth interspaces.

13. The electrode plate according to claim 1, wherein the current discharge lug is nickel-plated sheet steel.

14. The electrode plate according to claim 1, wherein metallization of the electrode framework is reinforced in the region of the welding-on of the current discharge lug.

15. The electrode plate according to claim 1, wherein the electrode framework is welded to the current discharge lug in the region of flanks of the teeth facing the teeth interspaces.

16. The electrode plate according to claim 1, wherein the thickness of the electrode framework increases continuously, within two to four times the tooth length, from the compressed weld-on edge thereof up to the full material thickness of the electrode framework.

17. The electrode plate according to claim 1, wherein the electrode framework is made from a material selected from the group consisting of nonwoven and needle-flat sheets, the material having a porosity between 50% and 98%, weight per unit area between 50 $g/cm^2$ and 900 $g/cm^2$, diameter of synthetic fibers between 0.4 dtex and 7.5 dtex fiber, length of between 15 mm and 80 mm, in which fibers have been activated, chemically metallized and galvanically reinforced by a metal coating, and the electrode framework is covered by a nickel coating of between 25 mg $Ni/cm^2$ and 300 mg $Ni/cm^2$.

18. A process for the production of an electrode plate having a porous electrode framework from metallized plastic, with a current discharge lug welded on in an overlapping manner on a weld-on edge of the electrode framework for use in electrochemical storage cells, in which material thickness of the current discharge lug in the weld-on end is made to decrease towards the weld-on edge, comprising the steps of punching teeth from a weld-on end of the current discharge lug to define teeth interspaces, placing and securing the current discharge lug with the weld-on end exclusively on only one flat side of the electrode plate in a positionally defined manner over the assigned weld-on edge of the electrode plate, pressing the weld-on end into the weld-on edge, welding-on the weld-on edge of the electrode framework, and permanently compressing transversely to a flat side thereof the material of the electrode framework assigned to the weld-on end of the current discharge lug in a region of the overlapping during welding of respective edges and, during welding, the material of the electrode framework is pressed into the teeth interspaces and is also welded onto flanks of the teeth interspaces.

19. The process according to claim 18, wherein, after the punching out of the teeth from the weld-on end but before the step of welding on, material draft is applied to the teeth by massive working.

20. The process according to claim 18, wherein gases produced during welding are removed by suction.

21. The process according to claim 18, wherein the step of welding includes applying the weld-on edge in a region of the material draft of the teeth of the weld-on end.

22. The process according to claim 18, wherein the weld-on edge of the electrode framework is positioned on half a length of the material draft.

23. The process according to claim 18, wherein, during the step of welding, excess melt of the electrode framework and of the current discharge lug is led away into the teeth interspaces.

* * * * *